United States Patent
Liu et al.

(10) Patent No.: US 11,082,369 B1
(45) Date of Patent: Aug. 3, 2021

(54) DOMAIN-SPECIFIC CHATBOT UTTERANCE COLLECTION

(71) Applicant: Figure Eight Technologies, Inc., San Francisco, CA (US)

(72) Inventors: Phoebe Liu, San Francisco, CA (US); Caiqun Xiao, San Francisco, CA (US); Tong Liu, New Rochelle, NY (US)

(73) Assignee: Figure Eight Technologies, Inc., San Francisco, CA (US)

( * ) Notice: Subject to any disclaimer, the term of this patent is extended or adjusted under 35 U.S.C. 154(b) by 0 days.

(21) Appl. No.: 16/544,438

(22) Filed: Aug. 19, 2019

Related U.S. Application Data (60) Provisional application No. 62/722,661, filed on Aug. 24, 2018.

(51) Int. Cl.
| | |
|---|---|
| *H04L 29/08* | (2006.01) |
| *G06F 17/30* | (2006.01) |
| *G06F 11/34* | (2006.01) |
| *G06F 11/30* | (2006.01) |
| *H04L 12/58* | (2006.01) |
| *G06N 3/04* | (2006.01) |
| *G06N 20/00* | (2019.01) |
| *G06F 40/169* | (2020.01) |

(52) U.S. Cl.
CPC ............ *H04L 51/02* (2013.01); *G06F 40/169* (2020.01); *G06N 3/04* (2013.01); *G06N 20/00* (2019.01)

(58) Field of Classification Search
CPC ....... H04L 51/02; G06F 40/169; G06N 20/00; G06N 3/04
USPC .......................................................... 709/206
See application file for complete search history.

(56) References Cited

U.S. PATENT DOCUMENTS

| | | | | |
|---|---|---|---|---|
| 10,089,067 | B1* | 10/2018 | Abuelsaad | .............. G06F 3/165 |
| 10,650,097 | B2* | 5/2020 | Yin | ....................... G06F 40/289 |
| 2012/0166183 | A1* | 6/2012 | Suendermann | ......... G06F 40/58 704/9 |
| 2015/0309987 | A1* | 10/2015 | Epstein | ................. G06F 40/279 704/9 |
| 2015/0314454 | A1* | 11/2015 | Breazeal | ............... B25J 9/0003 700/259 |
| 2016/0283455 | A1* | 9/2016 | Mardanbegi | ........... G10L 15/26 |

(Continued)

OTHER PUBLICATIONS

Lasecki et al., Conversations in the Crowd: Collecting Data for Task-Oriented Dialog Learning, Association for the Advancement of Artificial Intelligence, 2013.

(Continued)

*Primary Examiner* — Moustafa M Meky
*Assistant Examiner* — Elizabeth Kassa
(74) *Attorney, Agent, or Firm* — Van Pelt, Yi & James LLP (57) ABSTRACT

A set of utterances collected from a plurality of contributors is received. Semantically irrelevant utterances are removed from the set of utterances to obtain a processed set of utterances, including by applying a machine learning model to the set of utterances. An annotation user interface is provided to a plurality of human annotators to perform annotation on the processed set of utterances to obtain an annotated set of utterances. A curation user interface is provided to one or more domain experts to perform curation of the annotated set of utterances to obtain a curated set of utterances. The curated set of utterances is outputted as a training set for an automated dialogue agent.

20 Claims, 8 Drawing Sheets

(56) References Cited

U.S. PATENT DOCUMENTS

| | | |
|---|---|---|
| 2016/0350655 A1* | 12/2016 | Weiss .................. G06F 40/35 |
| 2017/0161393 A1* | 6/2017 | Oh ...................... H04L 51/32 |
| 2018/0261205 A1* | 9/2018 | Liang .................. G10L 15/22 |
| 2019/0130904 A1* | 5/2019 | Homma ............... G10L 15/26 |
| 2019/0197109 A1* | 6/2019 | Peters ................ G06F 40/295 |
| 2019/0237061 A1* | 8/2019 | Rusak ................ G06F 40/247 |
| 2019/0294804 A1* | 9/2019 | Di Leila ............. G06F 21/602 |
| 2019/0295545 A1* | 9/2019 | Andreas ........... G10L 15/1815 |
| 2020/0007380 A1* | 1/2020 | Chen .................. H04L 41/046 |
| 2020/0184278 A1* | 6/2020 | Zadeh ................ G06F 16/953 |

OTHER PUBLICATIONS

Levit et al., End-to-End Crowdsourcing Approach for Unbiased High-Quality Transcription of Speech, Association for the Advancement of Artificial Intelligence, 2015.

* cited by examiner

Context: The Phrases are commands from users to a voice assistant/smart speaker like Google Home or Amazon Alexa.

The paraphrased (new phrase) sentence is meant to be a different way of phrasing the same command for interacting with a voice assistant/smart speaker.

Phrase: *Add salad dressing to cart*
How would you rewrite the phrase using the following KEYWORDS: Salad dressing?
Responses must be relevant and must include all Keywords, or will be rejected.

Utterance (required)

i am going hiking this weekend — 602

Spelling mistake detected. Do you mean: [i am going hiking this weekend]?
Your text [i am going hiking this weekend] is detected as semantically irrelevant and incorrect spelling. Please re-enter your response — 604

(required)

☐ A valid text has been detected

FIG. 6

Scenario:
You are looking for a single family home

Utterance:
Is there the possibility of a single family home

How natural does the utterance sound? (in terms of what a native English speaker would say) (required)

|  | 1 | 2 | 3 | 4 | 5 | 6 | 7 |  |
|---|---|---|---|---|---|---|---|---|
| Unnatural | ○ | ○ | ○ | ○ | ○ | ● | ○ | Natural |

― 702

How close does the utterance convey the same meaning as the scenario? (required)

|  | 1 | 2 | 3 | 4 | 5 | 6 | 7 |  |
|---|---|---|---|---|---|---|---|---|
| Different | ○ | ○ | ○ | ○ | ○ | ○ | ● | Same |

― 704

Is the utterance in English? (required)
☒ Yes
○ No

🛈 Do NOT worry about capitalization or punctuation when you consider your rating.

FIG. 7

Customer: is there a pet friendly policy for the apartment
Agent #1: yes, Pet is allowed

Information (for agent):
Pet is allowed

Do you accept or reject the agent utterance? (required) — 802
- ○ Accept
- ◉ Reject
- ○ Out of scope If you reject the utterance, how would you rephrase this utterance to be more appropriate? (required)

> Yes, the owner do allow one pet, but you will need to obtain permission if you have a second pet. — 804

How relevant is the agent utterance based on the scenario and customer utterance? (required) (required) — 806

❶ Relevant: Whether the agent utterance sounds appropriate given the customer utterance How accurate is the agent utterance based on the text 'Information' provided? (required) (required) — 808

❶ Accurate: Whether the agent utterance contains the necessary information How natural does the agent sound in terms of a native English speaker?(?(required) (required) — 810

❶ Naturalness: Whether the utterance seems to mimic a real human response

How polite was the agent in terms of its role as a customer service provider?(required) (required) — 812

❶ Polite: Whether the utterance seems to have the proper social etiquette for a service provider

FIG. 8

DOMAIN-SPECIFIC CHATBOT UTTERANCE COLLECTION

CROSS REFERENCE TO OTHER APPLICATIONS

This application claims priority to U.S. Provisional Patent Application No. 62/722,661 entitled FRAMEWORK FOR DOMAIN-SPECIFIC CHATBOT UTTERANCE COLLECTION COMBINING MACHINE LEARNING (ML) AND HUMAN-IN-THE-LOOP ELEMENTS filed Aug. 24, 2018 which is incorporated herein by reference for all purposes.

BACKGROUND

Chatbot development is a growing field within artificial intelligence. Developing conversational chatbots is typically dependent on the collection of large volumes of high-quality training data emulating the way humans communicate. Chatbot development often requires human input. For example, the training data often includes a large number of utterance samples collected from human contributors. The utterance samples are what the human contributors believe, in the context of a specific domain/use case, a chatbot should say to a human, how a human would respond, and vice versa. Utterance samples, collected from human contributors, may not be of sufficient quality for training purposes if they use incorrect grammar, deviate from the specific domain/use case for which training is desired, or lack diversity in style and wording. To generate large sample data sets required for training, existing techniques typically require substantial additional human input in the form of humans manually monitoring and regulating utterance quality. Thus, to obtain enough high-quality training data is often costly and time consuming. It would be useful to have a way to improve the throughput of high-quality utterance sample collection.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Utterance collection is disclosed. In some embodiments, a set of utterances collected from a plurality of contributors is received. Anomalous data (e.g., semantically irrelevant utterances) from the set of utterances is removed to obtain a processed set of utterances, including by applying a machine learning model to the set of utterances. An annotation user interface is provided to a plurality of human annotators to perform annotation on the processed set of utterances to obtain an annotated set of utterances. A curation user interface is provided to one or more domain experts to perform curation of the annotated set of utterances to obtain a curated set of utterances. The curated set of utterances is outputted as a training set for an automated dialogue agent. The technique allows for machine-assisted utterance collection and improves the speed and accuracy with which sets of utterances are created to train automated dialogue agents (e.g., chatbots).

Developing a general chatbot capable of handling any type of topic is a challenging task. Oftentimes, chatbots are created with a specific domain/use case in mind. For example, an e-commerce company may focus on training a chatbot that excels at handling customer complaints and requests, but the same chatbot would not excel at understanding a request related to the weather. There exists a need for techniques that improve the collection of high-quality training data. Crowdsourcing can be used to collect training data. However, it is challenging to collect a large quantity of high-quality training data without substantial human involvement. For example, humans may be involved in reviewing grammar of utterances and relevance of utterances. Humans may also be involved in determining whether there is enough diversity in the utterances collected. Low-quality training data may result in poorly trained chatbots. Thus, there exists a need for techniques that improve the throughput of high-quality utterance sample collection by reducing human involvement. The techniques disclosed herein combine machine-assisted utterance collection with targeted human-in-the-loop elements, which increases the efficiency of utterance collection for the training of chatbots.

Figure 1:
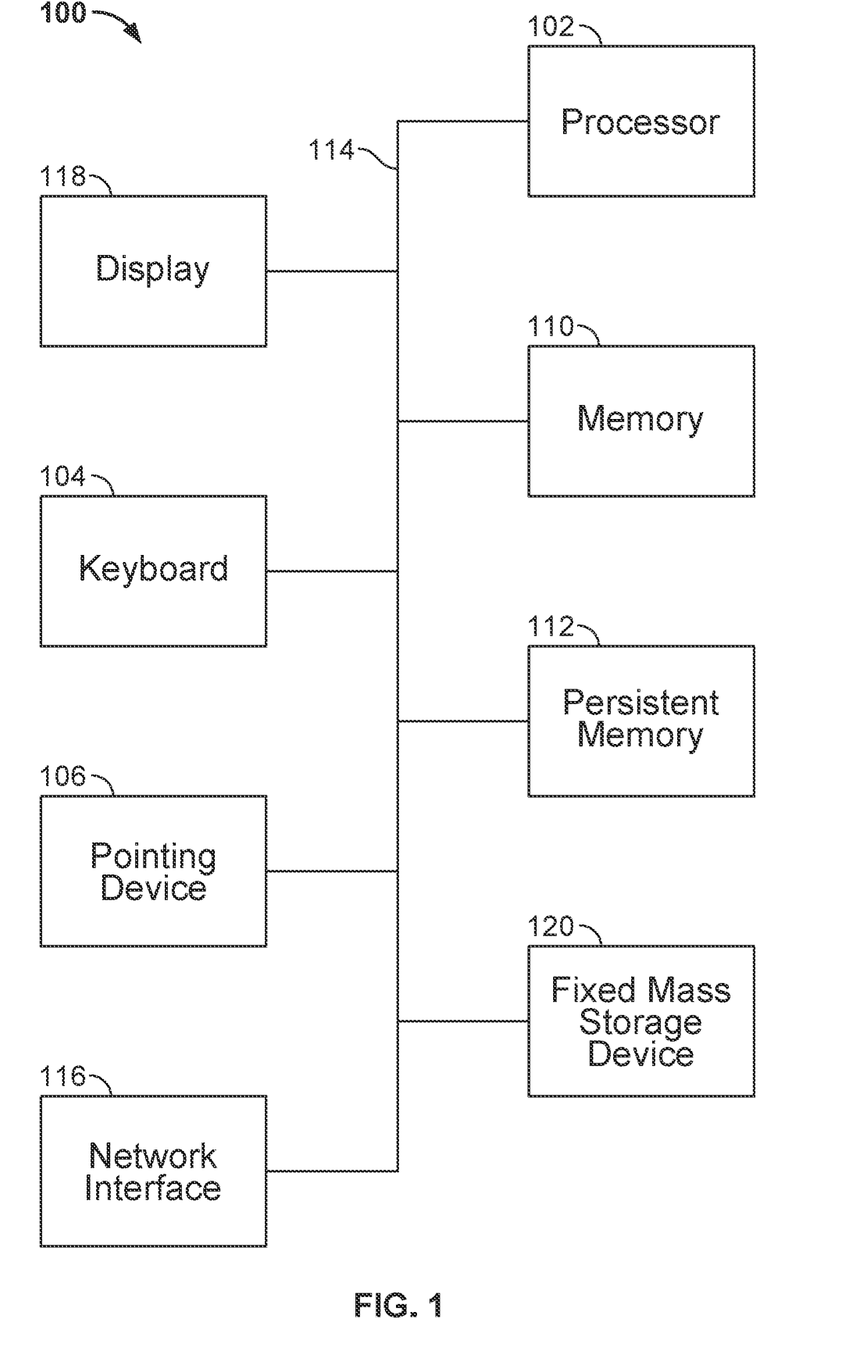
FIG. 1 is a functional diagram illustrating a programmed computer system for utterance collection in accordance with some embodiments.

FIG. 1 is a functional diagram illustrating a programmed computer system for utterance collection in accordance with some embodiments. As will be apparent, other computer system architectures and configurations can be used to perform utterance collection. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general-purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute the functions and processes described below with respect to FIGS. 3-8.

Processor 102 is coupled bi-directionally with memory 110, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also, as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

Persistent memory 112 (e.g., a removable mass storage device) provides additional data storage capacity for the computer system 100, and is coupled either bi-directionally (read/write) or uni-directionally (read only) to processor 102. For example, persistent memory 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Storages 112, 120 generally store additional programming instructions, data, and the like that typically are not in active use by the processor 102. It will be appreciated that the information retained within storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
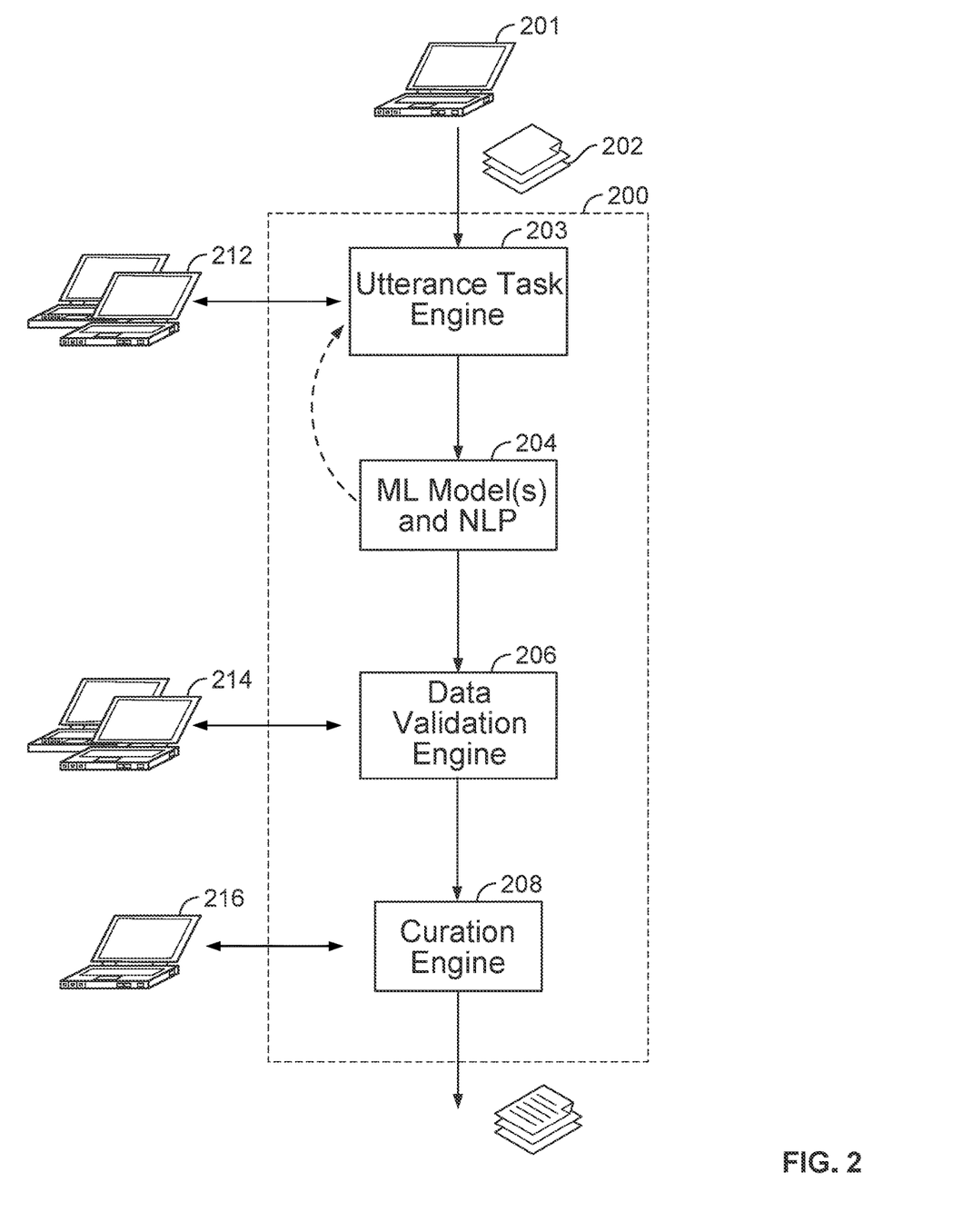
FIG. 2 is a block diagram illustrating an embodiment of an utterance collection platform.

FIG. 2 is a block diagram illustrating an embodiment of an utterance collection platform. In this example, utterance collection platform 200 can be a Figure Eight® utterance collection platform and can be implemented on one or more devices such as computer system 100, on a cloud-based platform, or the like. The utterance collection platform provides user interface (UI) components for interaction designers to upload job/task profiles, contributors to provide utterances, other contributors to provide annotations to utterances, and domain experts to perform curation of utterances, as well as machine learning (ML) models and natural language processing (NLP) routines to process utterances.

As shown, an interaction designer/requester (e.g., a customer of the platform) uses device 201 to access utterance collection platform 200 and provides a job profile 202 to the utterance collection platform to specify desired features of utterances to be collected. The requester can interact with annotation platform 200 using a browser-based application, a standalone client application, or the like.

An utterance task engine 203 provides user interfaces and logic for the requester to specify the requirements for an utterance collection job/task, such as style (formal, casual, etc.), tone (neutral, polite, humorous, etc.), and so forth. The requester also provides context and prompts for crowdsourcing contributors (e.g., see FIG. 6). For example, the context may be collection of utterances to train a voice assistant/smart speaker dialogue agent, and a sample prompt may ask crowdsourcing contributors (also referred to herein as contributors) to indicate how they would ask the voice assistant to buy an item from an online store. Contributors may be asked to provide semantically relevant variants of a question or phrase. The requester interacts with utterance task engine 203 on the platform to configure the job, providing requirements and payment information. In this example, contributors on the platform are human users that access the utterance collection platform using client devices 212 via browser-based applications, standalone applications, or the like. For example, contributors may interact with utterance task engine 203, which has been supplied with utterance collection task requirements by the requester. It is also possible for contributors to interact with an utterance collection engine separate from the engine that receives utterance collection job requirements. In some embodiments, the requester notifies contributors on the platform that the job is available, and the contributors select the job to participate. In some embodiments, the requester selects the contributors. In some embodiments, non-human (e.g., software) contributors also provide utterances. Software contributors utilize models trained to perform tasks that human contributors perform. For example, a trained chatbot can be a software contributor.

In the example illustrated, the platform provides ML model(s) and NLP 204 that can be used to automatically process collected utterances. Any appropriate ML model or set of ML models capable of classifying (e.g., classifying as irrelevant) utterances can be used. For example, an ML model can be used to determine if an utterance is out-of-scope. In various embodiments, utterances are represented in an embedding space, wherein the embedding space can be multilingual. Specifically, each utterance can be represented as an embedding space vector. As used herein, the embedding space vector refers to a numerical representation of text (e.g., a sentence-level utterance) in the form of an ordered set of coordinates with respect to a numeric vector space in which semantically similar text are associated with similar vectors. Stated alternatively, semantically similar text (e.g., utterances) are associated with coordinates that are close in distance to one another in the numeric vector space. Embedding space vectors can be created from utterances in many ways. In some embodiments, a Language Agnostic Sentence Representation (LASER) encoding is generated using a bidirectional long short-term memory (BiLSTM) encoder. Other neural network architectures that embed text into a vector space may also be used. In various embodiments, the encoder is pre-trained (e.g., trained on Wikipedia or other multi-language corpuses). Because multi-language corpuses are used to train encoders, the techniques described herein are generalizable beyond English. Because encoders (e.g., BiLSTM encoders) are pre-trained, utterance collection platform 200 uses the encoders in inference mode to generate embedding space vectors for utterances that the platform collects.

Figure 4:
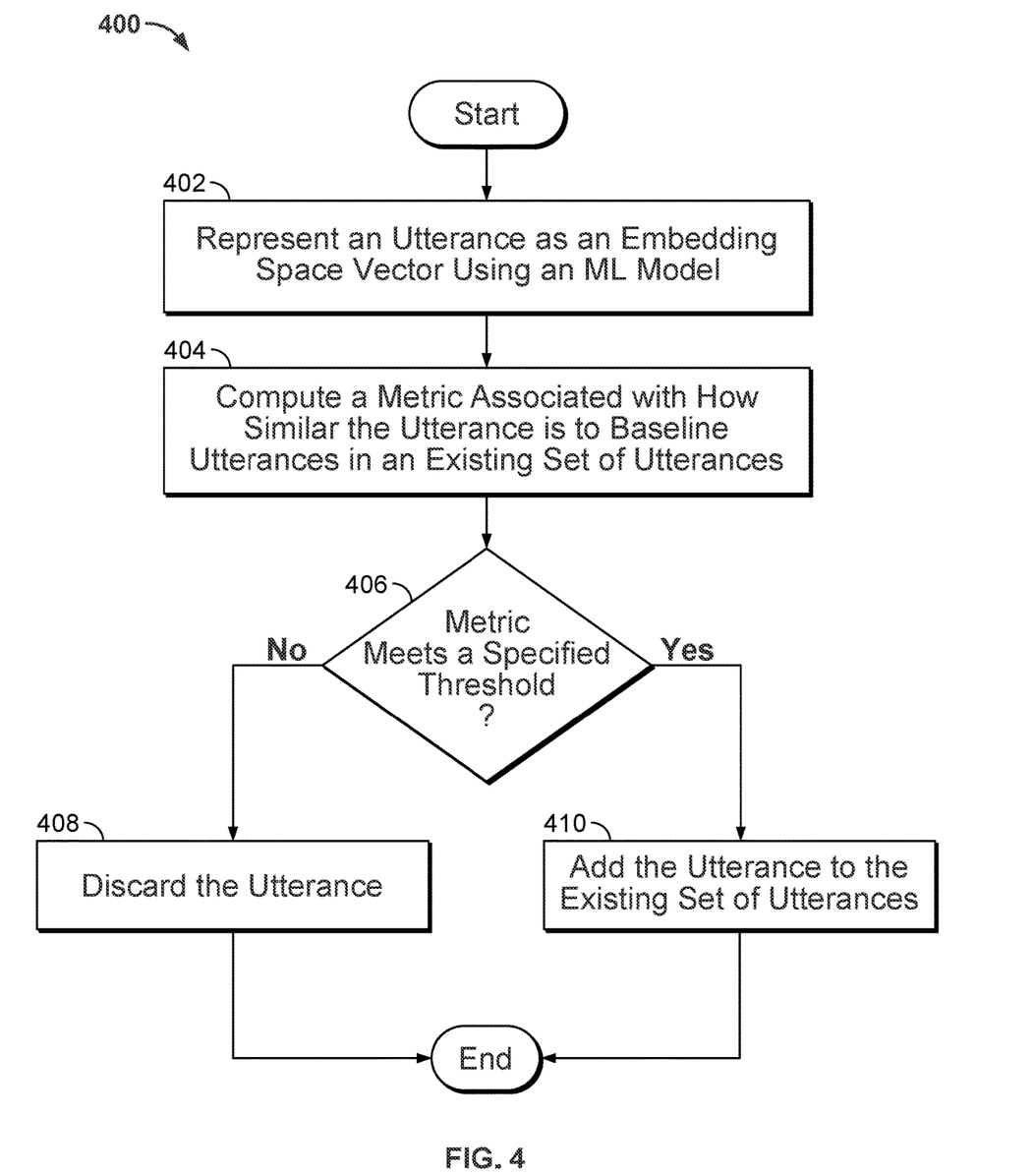
FIG. 4 is a flowchart illustrating an embodiment of a process for using a machine learning model to determine whether an utterance is semantically relevant.

In various embodiments, the ML model selects collected utterances to retain in a set of acceptable utterances (e.g., retain utterances meeting criteria specified by a requester of a crowdsourcing task) based on a determination of how similar the collected utterances are to baseline utterances. FIG. 4 shows an example process. Several algorithms can be used to make the determination. For example, algorithms based on calculating a density metric may be used. In this approach, a starting vector space density is first calculated for a group of coordinates corresponding to a set of baseline utterances. The baseline utterances correspond to a set of acceptable utterances (e.g., example utterances provided by the requester). For example, if the prompt asks crowdsourcing contributors to indicate how they would ask a digital voice assistant to buy an item from an online store, the requester may specify several acceptable example utterances. These example utterances are represented as embedding space vectors (e.g., using a BiLSTM encoder) and a baseline density of embedding space vector coordinates is computed. An example way of computing density is calculating the number of embedding space vector points in a specified portion of the embedding space (e.g., points per specified unit of volume). Another example way of computing density is calculating the number of embedding space vector points divided by the volume of a space encompassing all of these points or encompassing a specified fraction (e.g., 50%) of these points. A group of semantically similar utterances (as the baseline utterances should be) is associated with a higher density than a group of semantically dissimilar utterances. As more acceptable utterances (e.g., semantically similar utterances provided by contributors) are received, more points can be used to calculate the baseline density.

A collected utterance of interest is then represented as an embedding space vector using the same encoder and an updated density is calculated with the collected utterance added to the baseline group of utterances. If the updated density is less than the baseline density by more than a specified threshold amount, then it is determined that the collected utterance of interest is not similar enough to the baseline utterances to be considered semantically similar to the baseline utterances. Stated alternatively, if the collected utterance of interest causes the density to decrease by a specified threshold amount, then the collected utterance is considered anomalous (e.g., off topic, irrelevant, out-of-scope, etc.) and not accepted as semantically similar to the other utterances. If, on the other hand, the collected utterance of interest does not cause the density to decrease by more than the specified amount, then the collected utterance is considered semantically similar enough to the other utterances to be grouped with those utterances. In some embodiments, the threshold amount is static (e.g., 0.5%). In some embodiments, the threshold amount depends on the number of baseline utterances (e.g., the threshold amount is inversely proportional to the number of baseline utterances).

In some embodiments, a spread is computed instead of a density. For example, to determine whether a collected utterance of interest is semantically similar to a set of baseline utterances, a change in spread can be calculated. Examples of spread metrics include mean, variance, other moments, standard deviation, range, quartiles, interquartile range, center of mass, inertial moment, etc. If the change in spread when adding the collected utterance of interest to the baseline utterances exceeds a specified threshold amount, then it is determined that the collected utterance of interest is not semantically similar enough to the baseline utterances to group with the baseline utterances. On the other hand, if the change in spread does not exceed the specified threshold amount, then the collected utterance is considered semantically similar enough. The threshold amount may be static or depend on the number of baseline utterances. In some embodiments, a simpler metric (e.g., distance from a new point of interest to a closest baseline point, distance from a new point of interest to the center of mass of the baseline points, etc.) is used. Other metrics associated with determining the similarity of an utterance to other utterances may also be used.

In some embodiments, clustering of utterances is performed. For example, clustering may be performed if acceptable utterances fall into more than one group such that embedding space vector points representing the acceptable utterances form clusters in the embedding space. When clustering is performed, density or spread may be calculated with respect to a specific cluster in the embedding space. In some embodiments, clustering is not performed (e.g., when all collected utterances are in response to a single prompt and are expected to be semantically similar to a baseline example response).

A feature of the above techniques is that utterances from multiple contributors are incorporated, thus reducing biases toward any single contributor's responses. If desired, these techniques can be calibrated so that an utterance must be very different from multiple ways of responding to the prompt for it to be considered out-of-scope. The techniques can also be calibrated to be more selective in determining that an utterance is not out-of-scope. Thus, an advantage is that the machine learning model(s) can be tailored to requester preferences.

Figure 6:
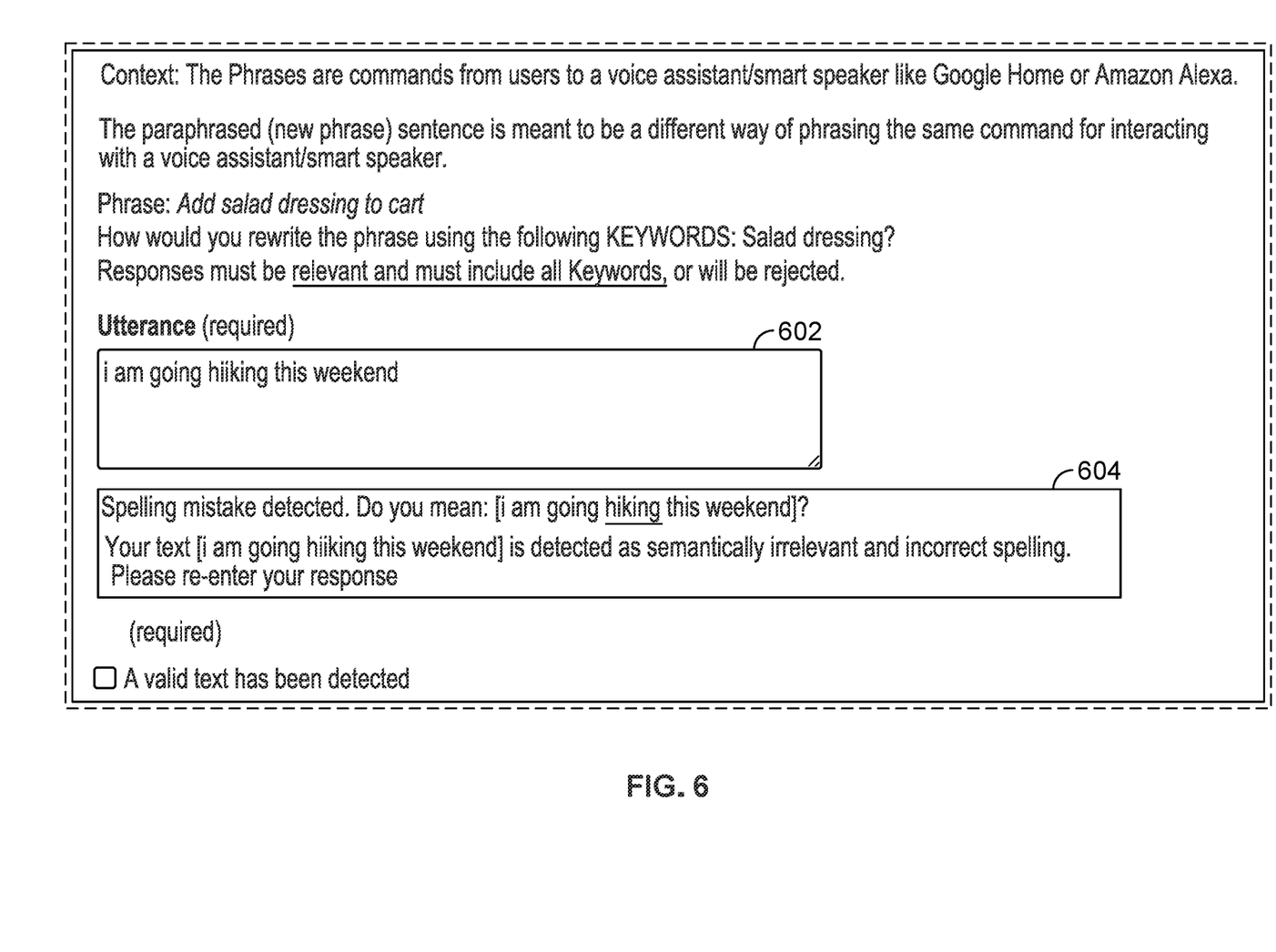
FIG. 6 is a screenshot illustrating an example user interface for collecting an utterance.

In the example illustrated, the automated processing also includes an NLP component (of ML model(s) and NLP 204). In various embodiments, the NLP automated processing includes specific rules applied to utterances collected from contributors. Example rules include discarding utterances that do not reach a specified character length and/or exceed another specified character length, discarding utterances that are in a foreign language (e.g., not in English when responses are specifically requested to be in English), discarding utterances that do not include a specified word or specified words (e.g., when the prompt requires the specified word or specified words), and so forth. In some embodiments, a coherence detector is used to remove portions of utterances that do not make sense (e.g., random characters, gibberish, repeated words and phrases, etc.). Similarly, omitted words and phrases can be inserted. Punctuation, spelling, and grammar may be corrected (e.g., via standard word processing functionality). Edits based on style preferences may also be performed (e.g., replacing informal words with their formal counterparts when the requester specifies that responses should be formal in style). Various NLP libraries may be used to perform the above processing. Examples of NLP libraries include NLPK, Gensim, and scikit-learn. In various embodiments, ML model(s) and NLP 204 provides feedback in real time to a contributor providing an utterance (e.g., while the contributor is working on the crowdsourcing task). For example, FIG. 6 shows feedback regarding a spelling mistake.

In some embodiments, errors identified by the automated processing of ML model(s) and NLP 204 (e.g., identified in real time) are reported to the contributor (e.g., see FIG. 6) so that the contributor can revise the collected utterance. Thus, there can be a feedback loop between utterance task engine 203 and ML model(s) and NLP 204 (indicated by the dotted arrow in the example illustrated). In some embodiments, the contributor is given one opportunity to revise an unacceptable utterance, and if the utterance is still not acceptable, it is discarded. It is also possible to allow multiple iterations for this feedback loop.

In the example illustrated, the automated processing of ML model(s) and NLP 204 is verified and/or adjusted by human annotators to achieve greater accuracy. Compared with not having any initial automated processing, having the initial automated processing as a starting point allows the annotators to go through utterances at a much faster rate. As will be discussed in greater detail below, the initial automated processing coupled with appropriate user interface tools can improve annotation throughput significantly while maintaining human-level accuracy. The human annotators interact with a data validation engine 206 via a client application (e.g., a browser-based application or a stand-alone application) on client devices 214. In this example, the client application and data validation engine 206 cooperate to provide a user interface that displays a prompt and a corresponding collected utterance (e.g., see FIG. 7). In some embodiments, the same crowdsourcing contributors that provide utterances can also be annotators (but not for the same utterances). In various embodiments, annotation is performed in real time (e.g., within seconds) after utterance collection, meaning that the contributor of any particular provided utterance can still be working on providing utterances while a different crowdsourcing worker annotates the provided utterance.

In some embodiments, annotators provide a score. For example, annotators can provide scores associated with how natural an utterance sounds, whether it conveys the proper meaning (e.g., as discerned from the prompt), whether it is in the proper style (e.g., as indicated by the prompt), whether it uses the proper tone (e.g., as indicated by the prompt), and so forth. A human-in-the-loop element is beneficial because it is typically difficult for ML models to rate properties such as style, tone, etc. In some embodiments, utterances are discarded based on annotation scores (e.g., utterances that do not have the style or tone specified by the requester).

In the example illustrated, utterances that are not discarded after processing by data validation engine 206 (e.g., not discarded based on annotation scores) are transmitted to curation engine 208. As shown, a domain expert uses device 216 to access curation engine 208 of utterance collection platform 200. In some embodiments, the domain expert is the interaction designer/requester (e.g., a customer of the platform) or a person associated with the interaction designer/requester. The domain expert may also be a crowdsourcing contributor that has a particular expertise (e.g., domain knowledge) associated with the utterances collected. In this example, curation engine 208 provides a user interface that displays relevant information to the domain expert (e.g., see FIG. 8). In addition to the prompt and collected utterance, various questions may be displayed. The domain expert may be asked the same questions annotators are asked, e.g., how natural an utterance sounds, whether it conveys the proper meaning, whether it is in the proper style, whether it uses the proper tone, etc. Thus, the domain expert may be asked to verify an annotator's work. The domain expert may also be asked to reject an utterance or correct the utterance. In various embodiments, the domain expert ensures that the end result is a curated dataset that is domain-specific with a consistent style.

Figure 7:
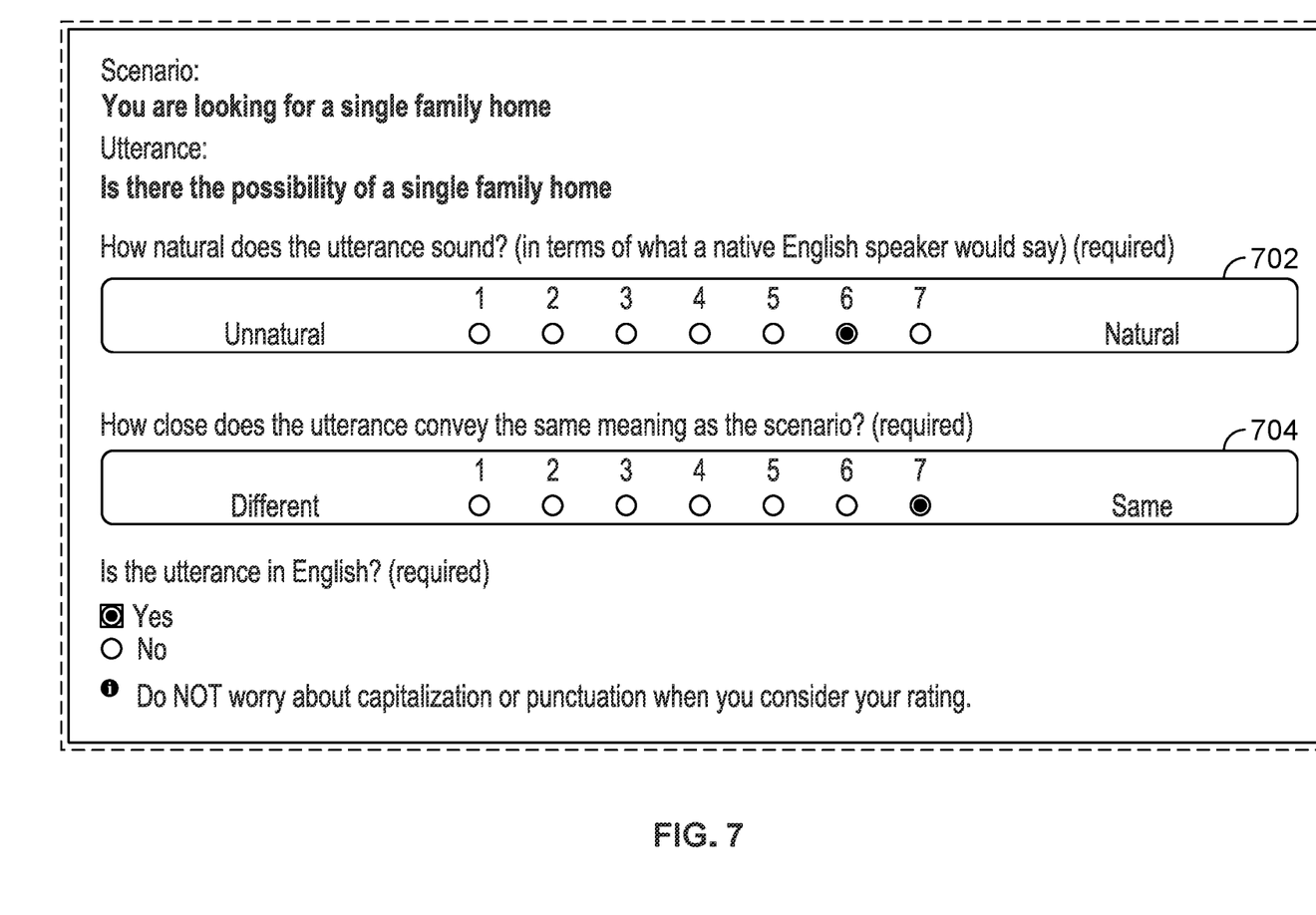
FIG. 7 is a screenshot illustrating an example user interface for annotating an utterance.
Figure 8:
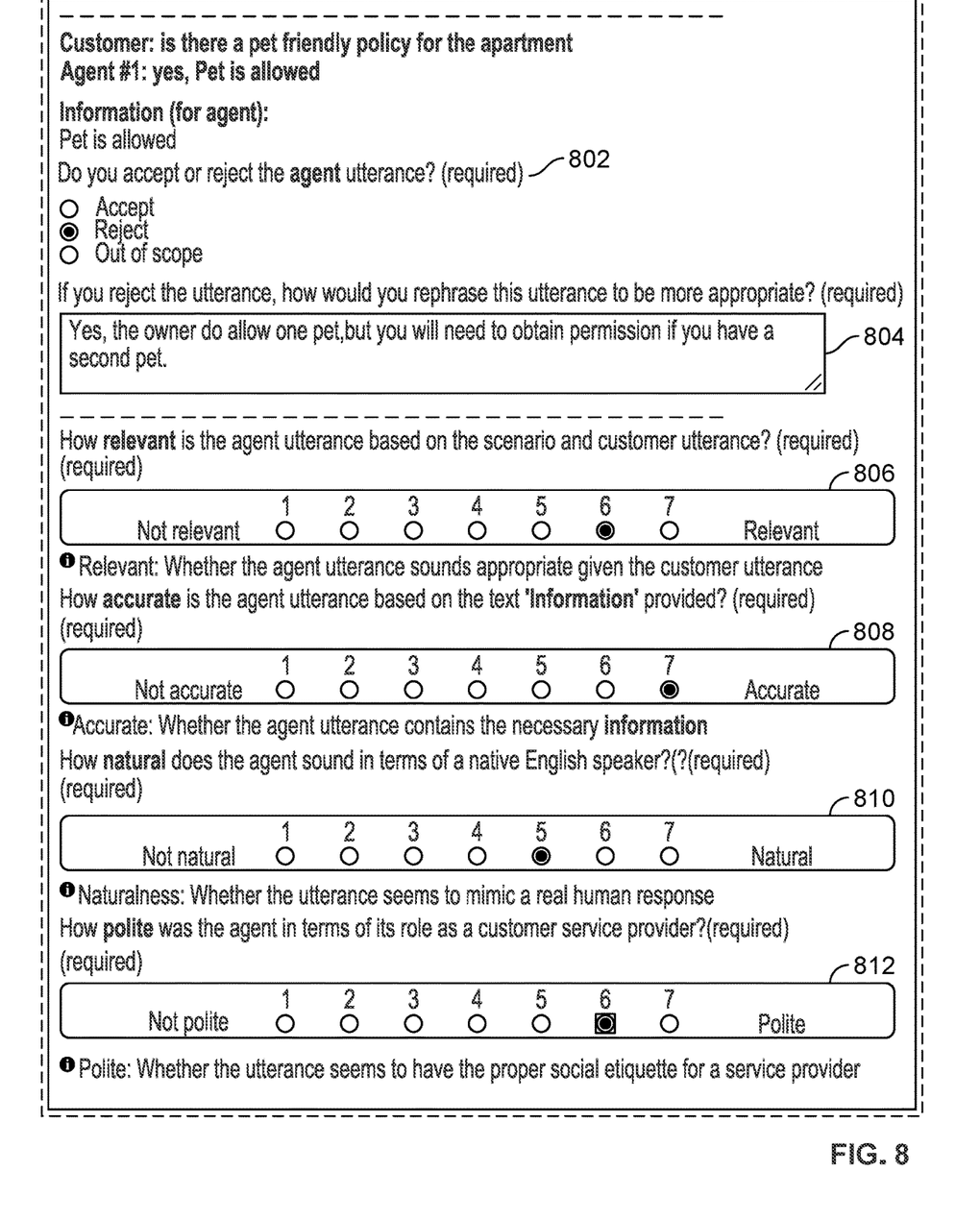
FIG. 8 is a screenshot illustrating an example user interface for curating an utterance.

FIGS. 6-8 are diagrams illustrating various embodiments of user interfaces configured to assist requesters, utterance contributors, annotators, and domain experts. In some embodiments, an HTML canvas with Javascript is used to implement one or more of the user interfaces of client applications executing on clients such as 201, 212, 214, and 216, providing a front end for the various users of utterance collection platform 200. In some embodiments, a graphic user interface is implemented in a browser and a browser-based overlaying HTML element is used. In some embodiments, a standalone client application is implemented using a programming language such as Java, C, C++, Objective C, etc. The user interfaces can be configured using appropriate application programming interfaces (APIs) and library functions and perform similar operations as described above.

In some embodiments, utterance collection platform 200 is configured to operate in a synchronous data collection mode in which two contributors interact with each other in real time to create user and agent datasets. For example, two contributors can be given a scenario and roles to perform (e.g., one contributor is a digital voice assistant, the other contributor is a human, and the scenario is the human wants the digital voice assistant to make an online purchase). In some embodiments, the two contributors concurrently connect to and interact with utterance task engine 203. Utterance collection platform 200 may also be used for non-chatbot training purposes, e.g., text data collection to train image captioning models or audio transcription models.

Figure 3:
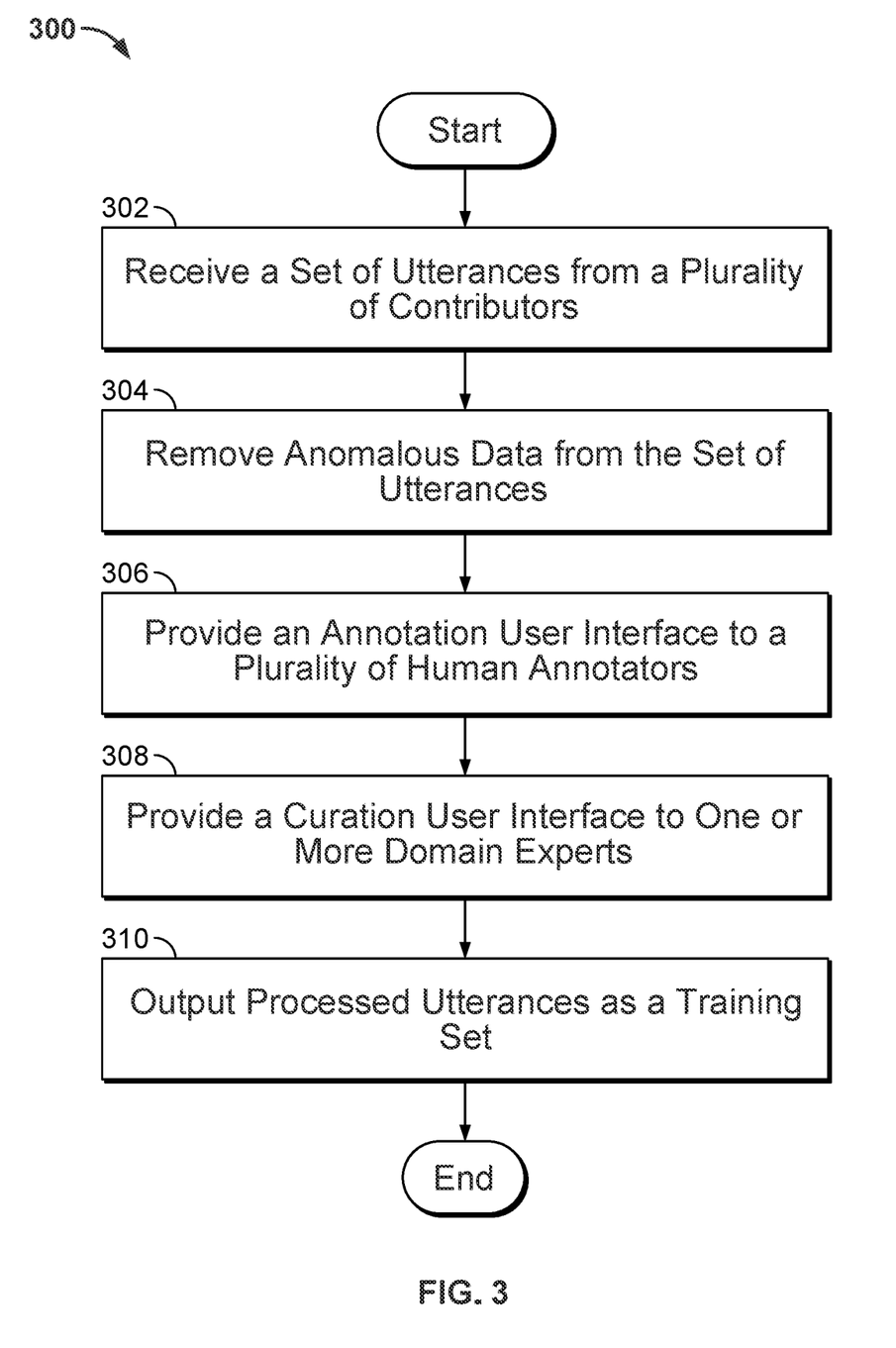
FIG. 3 is a flowchart illustrating an embodiment of a process for collecting a set of utterances as training data.

FIG. 3 is a flowchart illustrating an embodiment of a process for collecting a set of utterances as training data. In some embodiments, process 300 is performed by computer system 100 of FIG. 1. In some embodiments, process 300 is performed by utterance collection platform 200 of FIG. 2.

At 302, a set of utterances is received from a plurality of contributors. In some embodiments, the contributors are human contributors on a crowdsourcing platform. For example, the contributors may be providing utterances in response to prompts through utterance collection platform 200 of FIG. 2. In some embodiments, the contributors provide utterances by typing responses into a user interface (e.g., see FIG. 6). The plurality of contributors may also include non-human contributors (e.g., machine learning models that are trained to respond to prompts).

At 304, anomalous data is removed from the set of utterances. In some embodiments, removing anomalous data includes applying a machine learning model to the set of utterances to remove semantically irrelevant utterances. For example, a machine learning model (e.g., a BiLSTM encoder that has been trained on Wikipedia or other large corpuses to generate LASER encodings) can be used to represent sentence-level utterances as embedding space vectors, which can then be analyzed to discard utterances that are not semantically similar to baseline utterances (e.g., model or sample utterances provided by a creator of a prompt). In some embodiments, embedding space vectors are analyzed according to density or spread metrics. In some embodiments, removing anomalous data also includes applying NLP to the set of utterances. NLP may be used to check or correct punctuation, spelling, and grammar. NLP of the set of utterances may also include other edits and discarding of utterances based on specific rules (e.g., see FIG. 5). In some embodiments, ML model(s) and NLP 204 of FIG. 2 removes the anomalous data. In some embodiments, applying NLP follows applying an ML model. It is also possible to apply NLP first and then apply an ML model.

At 306, an annotation user interface is provided to a plurality of human annotators. In some embodiments, the annotation user interface is provided so that the plurality of human annotators can perform annotation on the machine processed set of utterances to obtain an annotated set of utterances. In some embodiments, the human annotators interact with the annotation user interface via a client application (e.g., a browser-based application or a standalone application). The human annotators may provide scores associated with utterance tone, style, relevance, or any other property requested by a creator of a prompt or requester of a crowdsourcing task. Rules may be applied to discard utterances based on annotation scores, thus reducing the curation workload. See FIG. 7 for an example of an annotation user interface.

At 308, a curation user interface is provided to one or more domain experts. In various embodiments, the curation user interface is provided so that the domain experts can perform curation (e.g., correction and/or rejection of utterances) on the annotated set of utterances to obtain a curated set of utterances. In some embodiments, the domain experts interact with the curation user interface via a client application (e.g., a browser-based application or a standalone application). Actions the domain experts may take include accepting, correcting, rejecting, and further annotating utterances. See FIG. 8 for an example of a curation user interface.

At 310, the processed utterances are outputted as a training set. In some embodiments, the training set is used to train an automated dialogue agent (e.g., a chatbot). Collection of domain-specific utterances (as associated with prompts provided by requesters of crowdsourcing tasks) is beneficial because chatbots are often created with a specific domain/use case in mind. For example, some chatbots are designed specifically to assist users with online shopping. For these chatbots, utterances related to requesting purchases and related dialogue are particularly useful for training. The utterances may also be used for non-chatbot training purposes, e.g., text data collection to train image captioning models or audio transcription models.

FIG. 4 is a flowchart illustrating an embodiment of a process for using a machine learning model to determine whether an utterance is semantically relevant. In some embodiments, process 400 is performed by ML model(s) and NLP 204 of utterance collection platform 200 of FIG. 2. In some embodiments, at least a portion of process 400 is performed in 304 of FIG. 3. In various embodiments, determining whether the utterance is semantically relevant is based on determining whether the utterance is semantically similar to other utterances that are known to be on-topic with respect to a prompt of interest.

At 402, an utterance is represented as an embedding space vector using an ML model. In some embodiments, a BiLSTM encoder generates a LASER encoding to represent the utterance. The same encoding method is also used to represent baseline utterances as embedding space vectors so that direct comparison of the utterance to the baseline utterances is possible. The goal of the encoding is that semantically related utterances map near one another in an embedding space. Stated alternatively, the goal is to group utterances in a vector space based on semantic similarity. In some embodiments, the baseline utterances are example acceptable utterances provided by the requester of the utterance collection task. Because the baseline utterances are known to be valid responses, any utterance that is semantically similar to a baseline utterance is also a valid response. In some embodiments, collected utterances that have been determined to be similar to the baseline utterances are added to the baseline utterances as additional baseline utterances. Stated alternatively, the set of baseline utterances may grow.

At 404, a metric associated with how similar the utterance is to baseline utterances in an existing set of utterances is computed. In some embodiments, the existing set of utterances includes only baseline utterances (e.g., acceptable utterances for which any utterance that is semantically similar would also be considered acceptable). The existing set of utterances may also include utterances that have not yet been determined to be acceptable. Comparison is performed with respect to baseline utterances (e.g., acceptable utterances) because the goal is to determine if a collected utterance of interest is semantically similar to utterances that are known to be acceptable.

In some embodiments, the metric is associated with density. For example, density of a set of points may be defined as the number of points in the set of points divided by the volume of a space encompassing a fraction (e.g., 50%, 75%, 90%, 100%, etc.) of the points. The space encompassing the fraction of the points can be defined in various ways. For example, in three dimensions, the space can be defined as a sphere centered on the center of mass of the set of points. Volume (and thus density) is generalizable to an n-dimensional measure for points in an n-dimensional space. In some embodiments, the metric is associated with the spread of the set of points (e.g., mean, variance, other moments, standard deviation, range, quartiles, interquartile range, center of mass, inertial moment, etc.). Measures other than density or spread may also be used.

In various embodiments, a vector space density or spread is computed for a set of points corresponding to the baseline utterances and then computed again for a set of points corresponding to the baseline utterances with the addition of a point corresponding to the utterance that is being evaluated for relevance. Then a change in density, spread, etc. is computed. Thus, in various embodiments, the metric is a change in density, spread, etc.

At 406, it is determined whether the metric meets a specified threshold. For example, in the case of density, it could be determined whether density decreases by a specified amount (e.g., 0.5%, 1%, etc.). In the case of spread, it could be determined whether spread increases by a specified amount (e.g., 0.5%, 1%, etc.). A decrease in density indicates that the utterance may not be relevant because semantically similar utterances are associated with vector space points that are grouped tightly in the embedding space. Similarly, an increase in spread indicates vector space points that are not as tightly grouped.

If at 406 it is determined that the metric does not meet the specified threshold, at 408, the utterance is discarded. In the case of density, not meeting the specified threshold corresponds to density decreasing by or more than a specified amount (e.g., 0.5%, 1%, etc.). Similarly, in the case of spread, not meeting the threshold corresponds to spread increasing by or more than a specified amount (e.g., 0.5%, 1%, etc.). This indicates the utterance is semantically dissimilar to the baseline utterances by such a degree that the utterance is unlikely to be relevant. Thus, the utterance is discarded. In some embodiments, semantically irrelevant utterances are identified and contributors are given an opportunity to revise the utterances instead of automatically discarding them (e.g., see FIG. 6).

If at 406 it is determined that the metric meets the specified threshold, at 410, the utterance is added to the existing set of utterances. In the case of density, meeting the specified threshold corresponds to density not decreasing by or more than a specified amount (e.g., 0.5%, 1%, etc.). Similarly, in the case of spread, meeting the threshold corresponds to spread not increasing by or more than a specified amount (e.g., 0.5%, 1%, etc.). This indicates the utterance is semantically similar enough to the baseline utterances that the utterance is likely to be relevant. Thus, the utterance is added to the existing set of utterances as a relevant utterance. In some embodiments, adding the utterance corresponds to keeping/not discarding the utterance. In some embodiments, the utterance is categorized as a baseline utterance to which other utterances being evaluated can be compared.

Figure 5:
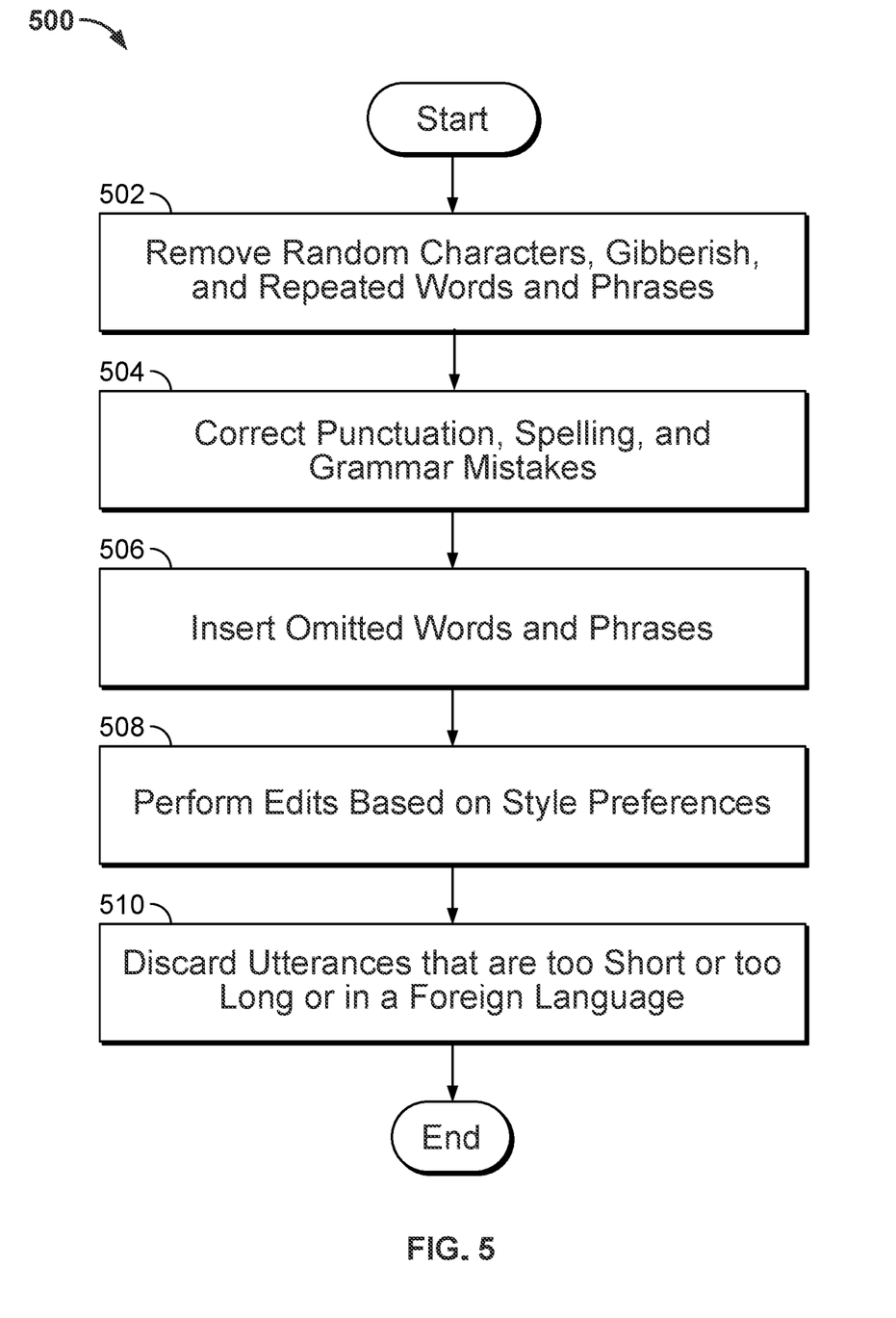
FIG. 5 is a flowchart illustrating an embodiment of a process for applying natural language processing.

FIG. 5 is a flowchart illustrating an embodiment of a process for applying natural language processing. In some embodiments, process 500 is performed by ML model(s) and NLP 204 of utterance collection platform 200 of FIG. 2. In some embodiments, at least a portion of process 500 is performed in 304 of FIG. 3. The example shown is illustrative and not restrictive. In some embodiments, not all of the steps in process 500 are performed. In addition, steps and processing not included in the example shown may be performed as part of natural language processing of utterances. In some embodiments, at least a portion of process 500 is performed in real time and displayed to a contributor of an utterance in order to allow the contributor to revise the utterance. The steps in process 500 may also be performed in a different order.

At 502, random characters, gibberish, repeated words and phrases, and/or other undesirable text are removed. For example, strings of characters that are not in a specified dictionary may be removed. In addition, sequences of words in which the words do not typically occur in that sequence may also be removed. In some embodiments, these edits are highlighted and suggested to the contributor. In some embodiments, these edits are performed automatically.

At 504, punctuation, spelling, and grammar mistakes are corrected. Punctuation, spelling, and grammar mistakes can be detected by using spelling/grammar detectors known to those skilled in the art. In some embodiments, these edits are highlighted and suggested to the contributor. In some embodiments, these edits are performed automatically. FIG. 6 illustrates an example of a spelling mistake and a suggested correction identified for the contributor.

At 506, omitted words and phrases are inserted. Omitted words and phrases can be detected by determining whether words in common word combinations have been omitted. In some embodiments, these edits are highlighted and suggested to the contributor. In some embodiments, these edits are performed automatically.

At 508, edits are performed based on style preferences. In various embodiments, style preferences are specified by an interaction designer/requester of an utterance collection task. For example, if a formal style is specified, contractions may be automatically converted to their spelled-out forms. In addition, words that are informal (e.g., as defined in a specified dictionary) may be changed to a formal synonym. In some embodiments, the edits are highlighted and suggested to the contributor instead of being performed automatically.

At 510, utterances that are too short or too long or in a foreign language are discarded. In some embodiments, an utterance is not correctable. For example, utterances in a language other than the one(s) the interaction designer/requester specified would be rejected. The interaction designer/requester may also specify minimum or maximum character or word limits for utterances.

FIG. 6 is a screenshot illustrating an example user interface for collecting an utterance. For example, the interface presented to crowdsourcing contributors by utterance task engine 203 of utterance collection platform 200 of FIG. 2 may look like the example illustrated. In this example, instructions for the crowdsourcing task are provided in the form of context for the task and a prompt that a crowdsourcing contributor is meant to respond to. In some embodiments, context is omitted and streamlined instructions are given. In various embodiments, an interaction designer/requester uploads the instructions, prompt, predefined intents (e.g., style specifications), and/or baseline utterances. In the example shown, the prompt/instructions direct the contributor to provide a variant of a baseline utterance. In this case, the baseline utterance concerns adding a consumer product to an online shopping cart.

In the example shown, the contributor has entered an utterance in text input box 602. In various embodiments, automated processing (e.g., performed by ML model(s) and NLP 204 of utterance collection platform 200 of FIG. 2) is applied to the entered utterance to remove noise (e.g., anomalous data). For example, an ML model can be used to determine whether the utterance is semantically relevant (e.g., semantically similar to the baseline utterance). In the example shown, the contributor has entered an utterance regarding going hiking during the weekend, which is not semantically similar to adding a consumer product to an online shopping cart. In this example, because the utterance is semantically irrelevant, the contributor is notified of this error in alert box 604. The contributor is given a chance to revise the utterance. It is also possible to configure the interface to automatically discard the utterance without giving the contributor the opportunity to revise the utterance. In various embodiments, natural language processing (e.g., to correct the types of mistakes described in FIG. 5) is also applied. In the example shown, the contributor is notified of a spelling error, given a suggested correct spelling, and given an opportunity to enter a new response.

FIG. 7 is a screenshot illustrating an example user interface for annotating an utterance. For example, the interface presented to human annotators by data validation engine 206 of utterance collection platform 200 of FIG. 2 may look like the example illustrated. In the example illustrated, scenario information and a contributor's utterance are presented to a human annotator. In the example shown, the annotator is also presented with a series of questions about the utterance (in question boxes 702 and 704) that can be answered by selecting from among enumerated scores. The question in question box 702 ("How natural does the utterance sound?") is an example of a stylistic question. Other examples of stylistic questions include questions about tone, humor, concision, etc. Style is oftentimes difficult for software agents to ascertain, making it beneficial to include human-in-the-loop elements in an utterance collection platform. The question in question box 704 ("How close does the utterance convey the same meaning as the scenario?") is an example of a semantic relevance question. Asking human annotators to rate semantic relevance is a way to verify semantic relevance judgments made by ML models. In various embodiments, annotation scores are used to determine whether an utterance is passed along to a domain expert for curation. For example, in the example shown, utterances rated as very unnatural (e.g., a score of 1) and/or very semantically irrelevant (e.g., a score of 1) would not be passed along. In this manner, annotation scores serve as a filter.

FIG. 8 is a screenshot illustrating an example user interface for curating an utterance. For example, the interface presented to domain experts by curation engine 208 of utterance collection platform 200 of FIG. 2 may look like the example illustrated. In various embodiments, the domain expert accepts, corrects, or rejects an utterance that has passed through automated processing and human annotation filters. The domain expert ensures that utterances that are ultimately used as training data are highly relevant and meet interaction designer/requester requirements (e.g., style requirements).

In the example shown, the domain expert is presented with selection choices 802. In this example, if the domain expert chooses to reject the utterance, the domain expert is given an opportunity to enter a revised utterance in box 804 (e.g., correct the utterance). In the example illustrated, the domain expert is also asked a series of questions regarding relevance and style in question boxes 806, 808, 810, and 812. Answers to these questions (e.g., scores) may be used to rank utterances and group the highest quality utterances together. This type of ranking and grouping can make it easier to revisit and study utterances later (e.g., to determine why utterances were rejected, which utterances are predicted to be the best training data, etc.).

Utterance collection incorporating machine learning and human-in-the-loop elements is disclosed. A benefit of incorporating machine learning is that this allows for machine-assisted utterance collection that improves the speed and accuracy with which sets of utterances are created to train automated dialogue agents (e.g., chatbots). A machine learning model can be used to filter out semantically irrelevant utterances. Thus, incorporating machine learning improves the throughput of high-quality utterance sample collection by reducing human involvement. In addition, the selectivity of the machine learning model in determining semantic relevance of utterances can be calibrated. Thus, another advantage is that the machine learning model can be tailored to the preferences of a requester of a crowdsourcing task. Human-in-the-loop elements ensure consistent domain-specific results. Thus, a complete workflow for the collection and validation of utterances is achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
receiving a set of utterances collected from a plurality of contributors;
removing one or more semantically irrelevant utterances from the set of utterances to obtain a processed set of utterances, including by applying a machine learning model to determine how semantically similar an utterance in the set of utterances is to a set of one or more baseline utterances;
providing an annotation user interface to a plurality of human annotators to perform annotation on the processed set of utterances to obtain an annotated set of utterances;
providing a curation user interface to one or more domain experts to perform curation of the annotated set of utterances to obtain a curated set of annotated utterances; and
outputting the curated set of annotated utterances as a training set for an automated dialogue agent.

2. The method of claim 1, further comprising applying natural language processing to the processed set of utterances or to the set of utterances collected from the plurality of contributors.

3. The method of claim 2, wherein the natural language processing includes at least one of the following: removing characters or words, inserting characters or words, correcting punctuation, spelling, and grammar, making style edits, discarding utterances that do not meet specified length criteria, or discarding utterances that are not in a specified language.

4. The method of claim 2, wherein the natural language processing is applied based at least in part on a specification of desired utterance characteristics created by a requester of a crowdsourcing task.

5. The method of claim 1, wherein the plurality of contributors includes at least one software contributor.

6. The method of claim 1, wherein the machine learning model used in removing the one or more semantically irrelevant utterances from the set of utterances is configured to generate numerical representations of utterances in the set of utterances, the numerical representations of utterances in the set of utterances being coordinates in a vector space in which semantically related utterances map to points close to one another in the vector space.

7. The method of claim 1, wherein the machine learning model used in removing the one or more semantically irrelevant utterances from the set of utterances is configured to generate Language Agnostic Sentence Representation (LASER) encodings of utterances.

8. The method of claim 1, wherein the machine learning model used in removing the one or more semantically irrelevant utterances from the set of utterances is a bidirectional long short-term memory (BiLSTM) encoder that has been pretrained on one or more corpuses.

9. The method of claim 1, wherein removing semantically irrelevant utterances from the set of utterances collected from the plurality of contributors includes computing a metric associated with how similar each utterance that is being evaluated for removal is to baseline utterances and determining if the metric meets a specified threshold.

10. The method of claim 9, wherein the metric is associated with a density of points in a vector space in which the points in the vector space encode utterances in the set of utterances.

11. The method of claim 9, wherein the metric is associated with a spread of points in a vector space in which the points in the vector space encode utterances in the set of utterances.

12. The method of claim 1, further comprising providing an utterance collection user interface that is configured to receive a typed utterance in response to a prompt.

13. The method of claim 12, wherein the utterance collection user interface is further configured to provide feedback regarding utterance relevance and linguistic errors in real time and provide an opportunity to input a revised utterance.

14. The method of claim 1, wherein the annotation user interface is configured to receive numerical scores associated with the processed set of utterances with respect to at least one of the following: relevance, meaning, accuracy, or style.

15. The method of claim 14, wherein utterances in the processed set of utterances are discarded based at least in part on the received numerical scores.

16. The method of claim 1, wherein the annotation user interface is configured to be available for each particular utterance in the processed set of utterances with substantially no delay after the particular utterance is added to the processed set of utterances.

17. The method of claim 1, wherein the curation user interface is configured to request acceptance, rejection, or correction of utterances in the annotated set of utterances.

18. The method of claim 1, wherein the curation user interface is configured to receive numerical scores associated with the annotated set of utterances with respect to at least one of the following: relevance, meaning, accuracy, or style.

19. A system, comprising:
a processor configured to:
receive a set of utterances collected from a plurality of contributors;
remove one or more semantically irrelevant utterances from the set of utterances to obtain a processed set of utterances, including by applying a machine learning model to determine how semantically similar an utterance in the set of utterances is to a set of one or more baseline utterances;
provide an annotation user interface to a plurality of human annotators to perform annotation on the processed set of utterances to obtain an annotated set of utterances;
provide a curation user interface to one or more domain experts to perform curation of the annotated set of utterances to obtain a curated set of annotated utterances; and
output the curated set of annotated utterances as a training set for an automated dialogue agent; and
a memory coupled to the processor and configured to provide the processor with instructions.

20. A computer program product, the computer program product being embodied in a non-transitory computer readable storage medium and comprising computer instructions for:
receiving a set of utterances collected from a plurality of contributors;
removing one or more semantically irrelevant utterances from the set of utterances to obtain a processed set of utterances, including by applying a machine learning model to determine how semantically similar an utterance in the set of utterances is to a set of one or more baseline utterances;
providing an annotation user interface to a plurality of human annotators to perform annotation on the processed set of utterances to obtain an annotated set of annotated utterances;
providing a curation user interface to one or more domain experts to perform curation of the annotated set of utterances to obtain a curated set of utterances; and
outputting the curated set of annotated utterances as a training set for an automated dialogue agent.

* * * * *